Sept. 11, 1962    M. M. VERHEUL    3,053,278
DOUBLE CHECK VALVE FOR STANDPIPE USE
Filed June 11, 1959
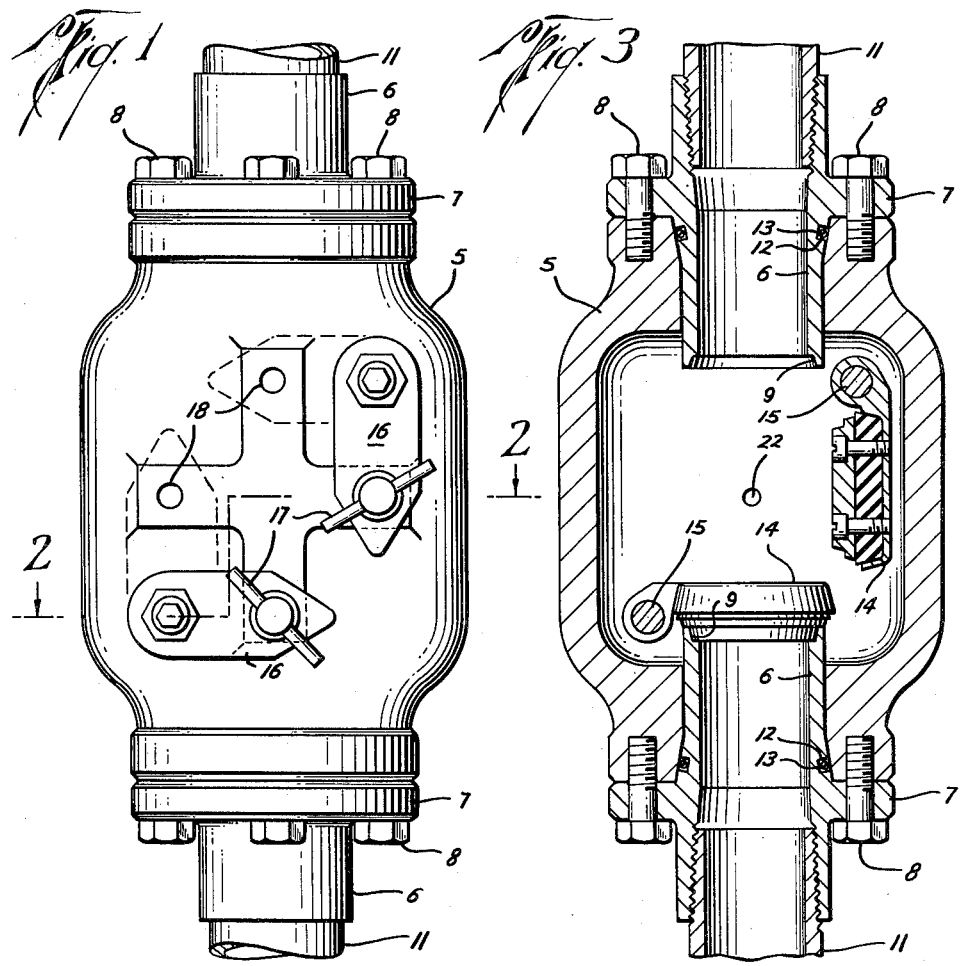
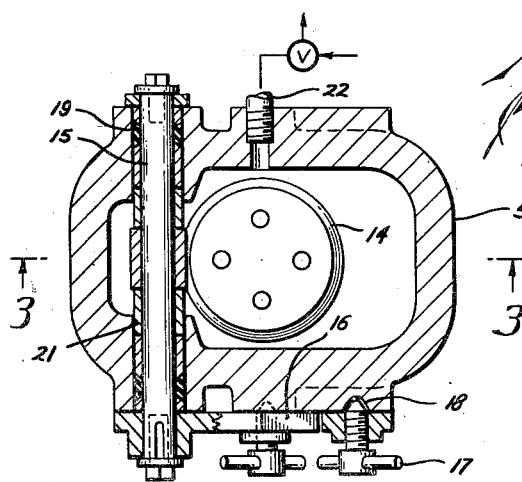
Maarten Marinus Verheul
INVENTOR.
BY Browning, Simmes,
Myers and Eisenrohr
ATTORNEYS

United States Patent Office 3,053,278
Patented Sept. 11, 1962

3,053,278
DOUBLE CHECK VALVE FOR STANDPIPE USE
Maarten M. Verheul, P.O. Box 2172, Houston, Tex.
Filed June 11, 1959, Ser. No. 819,690
2 Claims. (Cl. 137—614.21)

In oil well drilling operations large volumes of mud are pumped through a standpipe, a mudline and drill string to the bottom of the well being drilled. As the well grows deeper high pressure at the bottom of the well frequently develops. This pressure may be so great as to force the mud backward against pressure of pumps, thus causing severe overloading of motors driving the pumps and forcing rock chips back up into the pumps where they may damage pistons and cylinders. Even when the pressure is not great enough to overcome pressure from pumps a mudline may burst and pumps continue to run, thus forcing large volumes of mud out of the burst mudline before the pumps can be stopped. Since mud usually contains weighting materials and additives introduced to give proper specific gravity and viscosity, the loss of large quantities of mud can be quite expensive. Mud from a burst mudline also will cover the drilling floor, interfere with operations, and because of its volume be expensive to clear away.

It is the object of this invention to provide a fast acting check valve for standpipe or mudline service. Another object is to provide such valve which may be positively locked in either open or closed positions. Another object is to provide such valve in which leakage of fluid from either direction increases the tightness of closure of the valve. Another object is to provide such valve which is rugged and dependable, non-leaking in use and which may be easily and rapidly assembled or disassembled for repair or service when needed. Another object is to provide a means for preventing loss of mud when mudline breaks occur or when well pressure exceeds mud pump pressure during drilling operations.

The present invention is directed to a double check valve. Two check valves are disposed in a single housing to check flow of fluid in opposite directions. Ball or poppet type valves may be used, but flapper type valves are preferred for standpipe or mudline use because they may be operated manually by levers located outside the housing, and in open position are easily located outside the principal path of flow of mud carrying abrasive particles.

In a preferred modification the invention comprises a housing having two pivotally mounted flapper type check valves therein. For standpipe use the housing is mounted vertically. One check valve moves upward to close and the other downward on horizontal rotatable shafts carried by the body of the housing. These valves close upon valve seat members which also serve as end closures of the housing. The valve seat members are demountably attached to the body, have inlet and outlet conduits through them and are made non-leaking by having an annular groove around them of such size as to receive a suitable O-ring seal in a line of contact with the housing. The outer end of the valve seat members preferably are threaded to receive standpipe sections, thus minimizing requirements for gaskets or other seals. This type of construction provides for ease in removing the valve seat member for replacement or repair and gives a short, wide opening into the interior of the housing when repair of a valve closure member is necessary, and also permits the use of valve seats larger in diameter than the internal diameter of the threaded section.

The valves are operable by external means for moving them to either closed or open positions, preferably by manually operated levers or handles. The external handles are locked in either open or closed positions by locking members such as set screws threaded through the handles, or spring actuated pins passing through them and engaging suitable recesses in the housing. A valved line communicates with the interior of the housing and provides a means independent of the inlet and outlet through the valve seat members for introducing a non-compressible fluid under pressure into the housing when both valves are turned to closed position. The non-compressible fluid completely fills the interior of the housing and serves as a positive lock holding both valves closed even against very heavy pressures. Any slight leakage of mud passing one of the closed valves into the body of the housing, thus serves to increase pressure upon both valves, seating them more tightly against the valve seats.

Other objects, advantages and features of this invention will be apparent to one skilled in the art upon a consideration of the written specification, the attached claims and the annexed drawings.

The attached drawings illustrate one preferred type of valve construction according to the present invention.

In the drawings, wherein like reference characters are used throughout to designate like parts:

FIG. 1 is an elevation of this valve arranged for standpipe use.

FIG. 2 is a cross-section through the valve of FIG. 1 on the line 2—2.

FIG. 3 is a vertical section through the same valve on the line 3—3 of FIG. 2.

The drawings show a strong housing 5 arranged vertically. Both the upper and lower ends of housing 5 are closed by valve seat members 6 disposed through the end walls of the housing and having a projecting flange 7 attached to the housing by machine screws 8. The inner ends of members 6 are formed into valve seats 9. The valve seat members 6 are thus easily removable for replacement or repair when the abrasive nature of the fluid used makes such operations necessary and their removal provides a wide port of access to the interior of housing 5 when repairs to valve closure members 14 are necessary. Conduits passing through members 6 serve as inlet and outlet for housing 5.

As shown in FIG. 3, the closure members 14 are pivoted on opposite sides of the longitudinal axis of the housing and adjacent to the ends thereof; and the housing is so short in comparison with the size of valve seats 9 and the closure members 14 that the swinging movement of the closure members overlaps and the closure members do not operate simultaneously, but sequentially, with one closure member moved to a position to clear the other before the latter is moved. No disadvantage results from this arrangement since seating of the first closure member is assisted by pressure of fluid flowing into the valve housing. When the first closure member is seated, pressure builds up rapidly in the body to the full pressure of the fluid entering the housing; and the second closure member may be swung to seated position easily with pressure balanced on its opposite faces. This structure provides a light, very compact valve for mudline or standpipe use and results in important savings in size, weight and cost of the valve.

Members 6 have annular horizontal grooves 12 around them, of size suitable to receive an O-ring seal 13 between members 6 and housing 5. The valve is thus rendered non-leaking even under very high pressure and the necessity for a gasket under flange 7 is eliminated. Two identical valve closure members 14 are disposed within housing 5 and are carried by rotatable horizontal shafts 15. One of the members 14 is disposed to swing upward to close the conduit through the upper valve seat member 6 against upward flow of fluid while the other member 14 is disposed to swing downward to close the conduit in the lower valve seat member 6 against downward flow of fluid in the position illustrated for the lower member 14 in FIG. 3. Handles 16 are rigidly attached to shafts 15 and located outside housing 5. Shafts 15 thus may be rotated by moving exterior handles 16 to open or close the conduit through the valve seat members 6. Set screws 17 are threaded into handles 16 and may be turned to enter recesses 18 in housing 5 thus locking the valves in either open or closed positions as desired. Leakage around shaft 15 is prevented by packing 19 shown only in FIG. 2. Suitable spacing members 21 also are provided to center valve closure member 14 on valve seat 9.

A valve line 22 communicates with the interior of housing 5 and serves as a means for introducing a non-compressible fluid under pressure to fill the housing substantially completely when both valve closure members have been moved to closed positions. Pressure of fluid in housing 5 on the valve closure members forces them into tighter contact with valve seats 9. Any slight leakage of fluid from either upper or lower standpipe sections 11 into the housing merely increases pressure upon valve closure members 14 and forces them into tighter contact with valve seats 9.

Many variations from the structure illustrated may be made without departing from the spirit of this invention. For example, the valve seats 9 may be made as a separate piece attached to members 6. Set screws 12 may be replaced by spring actuated pins fitting into recesses 18 in housing 5. A single external handle with suitable linkage for turning both shafts 15 simultaneously may be substituted for the two handles illustrated. The shafts 15 may be rotated to open or close the valve by a solenoid or other automatic device. Many other possible minor variations in structure may be made if desired.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described what is claimed is:

1. A two-way check valve comprising in combination a short one piece housing having a bore therethrough, said bore having an enlargement within the housing; a pair of elongated hollow valve seat members disposed in line in said bore extending through opposite ends of the housing having their ends within said housing formed into annular valve seats; a flange upon each of said valve seat members exterior of said housing; means for attaching said flange to said housing; an O-ring seal disposed to seal between each of said valve seat members and said housing; a pair of pivoted flapper valve closure members disposed within the housing in position to swing into said enlargement of the bore outside the principal path of flow therethrough and to swing to seat upon and close passageways through said valve seats, said closure members being pivoted on opposite sides of a longitudinal axis of the housing adjacent to ends of the housing at locations sufficiently near each other to result in overlapping swinging movement of the valve closure members; externally operable means for swinging said valve closure members sequentially into open position in said enlargement and into seated position on said valve seats; means for positively locking said valve closure members in open and closed positions; and means comprising a valved line communicating with said bore for introducing a non-compressible fluid into the interior of the housing under pressure with both valve closure members in seated position.

2. A two-way check valve comprising in combination a short one-piece housing having a bore therethrough, said bore having an enlargement within the housing; a pair of elongated hollow valve seat members disposed in line in said bore extending through opposite sides of the housing and having their ends within the housing formed into valve seats; a seal disposed between each of said valve seat members and said housing; external means for attaching said valve seat members to the housing; a pair of pivoted flapper valve closure members each disposed within the body in position to swing into said enlargement of the bore outside the principal path of flow through said bore and to seat upon and close a passageway through one of said valve seat members, said valve closure members being pivoted at locations within said enlargement and offset from one another both longitudinally and transversely of the bore sufficiently to permit both to occupy simultaneously fully open positions in said enlargement outside said principal path of flow and sufficiently near each other to result in overlapping swinging movement of the valve closure members; external means for swinging said valve closure members sequentially into open position in said enlargement and sequentially into seated position on said valve seats; and means for locking said valve closure members in open and closed positions.

References Cited in the file of this patent

UNITED STATES PATENTS

| | | |
|---|---|---|
| 677,687 | Nagengast | July 2, 1901 |
| 1,344,383 | Conran | June 22, 1920 |
| 1,483,081 | Dean | Feb. 12, 1924 |
| 1,699,095 | Clark | Jan. 15, 1929 |
| 2,274,776 | Cull | Mar. 3, 1942 |
| 2,533,921 | Dahl | Dec. 12, 1950 |
| 2,756,017 | Silverman | July 24, 1956 |